Aug. 9, 1960 J. F. MUNRO 2,948,317
THREADED FASTENER RETAINING DEVICE
WITH RESILIENT HOLDING MEANS
Filed July 1, 1957

INVENTOR.
JOHN F. MUNRO
BY Paul R. Webb, II
HIS ATTORNEY

United States Patent Office 2,948,317
Patented Aug. 9, 1960

2,948,317

THREADED FASTENER RETAINING DEVICE WITH RESILIENT HOLDING MEANS

John F. Munro, Cincinnati, Ohio, assignor to General Electric Company, a corporation of New York Filed July 1, 1957, Ser. No. 668,976

2 Claims. (Cl. 151—69)

This invention relates to threaded fastener retaining devices and more particularly to threaded fastener retaining devices which house securely the threaded end portion of a fastener therein when the retaining device in a flange aperture is not affixed to another structure.

A high temperature, radioactive environment presents a problem in fastening adjoining structures together. Under these conditions it is desirable that a fastening structure include a threaded fastener retaining device which retains the threaded end portion of the fastener within the device in its disengaged condition. Such an arrangement simplifies a remotely handled fastening operation and protects the threaded end portion of the fastener during alignment of the structures.

One type of prior retaining device employs a resilient cone member in the counterbore of its housing to secure the threaded portion of a bolt therein when the retaining device is not engaged to an adjoining structure. Such a cone member exerts a binding force against the unthreaded bolt shank to prevent the bolt from easily sliding out of its housing. An accidental force on the bolt head would overcome the binding force and expose the bolt threads to damage outside the housing. Furthermore, the resilient cone member material would not function properly under the above-mentioned rigrorous conditions.

The invention of the present application provides an improved threaded fastener retaining device which retains securely at any attitude the threaded end portion of the fastener within the device in its disengaged condition in a high temperature radioactive environment.

It is an object of my invention to provide an improved threaded fastener retaining device which employs a flexible retaining member to retain the threaded end of a fastener within the device in its disengaged condition.

It is another object of the invention to provide an improved threaded fastener retaining device which includes a headed fastener with two threaded portions for movement within the device and for attachment to other structures, respectively.

It is another object of the invention to provide an improved threaded fastener retaining device into which a new fastener can be inserted and secured rapidly.

It is a further object of the invention to provide an improved threaded fastener retaining device which is positioned easily in a simple flange aperture to produce a fastening structure.

In carrying out my invention in one form, a housing has a headed fastener in its axial bore which is engaged by a flexible retaining member to provide a threaded fastener retaining device.

These and various other objects, features and advantages of the invention will be better understood from the following description taken in connection with the accompanying drawing in which.

Figure 1:
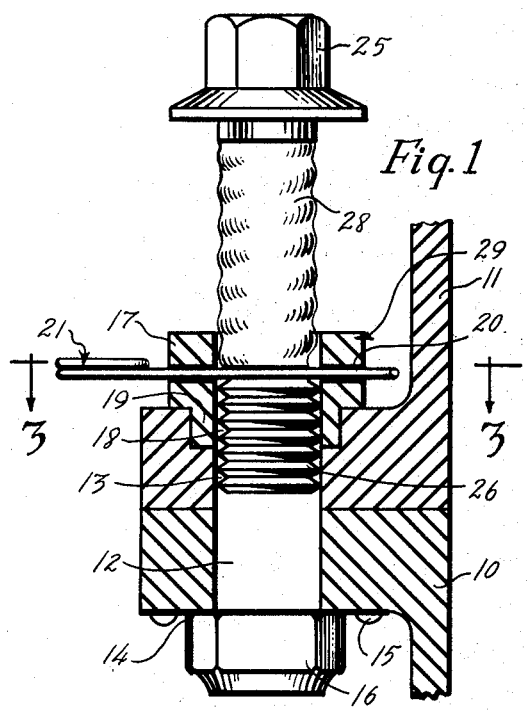
Fig. 1 is a sectional view of a lower flange and an upper flange with a threaded fastener retaining device embodying my invention.

In Fig. 1 of the drawing, a lower flange 10 and an upper flange 11 are shown as adjoining structures with apertures 12 and 13, respectively. A nut retaining basket 14 is secured at lower, outer surface of flange 10 around the periphery of aperture 12 by means of bolts 15. A threaded nut 16 is held tightly within basket 14 to provide an attaching member for a threaded fastener. A housing 17 with an axial bore 18 therethrough forming an opening at each end thereof is positioned in the upper end of aperture 13 by means of a shoulder 19 around lower periphery of the housing. If it is desired, aperture 13 can have a greater diameter than aperture 12 to locate the surface of housing 17 flush with or above the lower surface of flange 11. Housing 17 is positioned in aperture 13 by press fitting, threading, keying, staking or welding.

Figure 2:
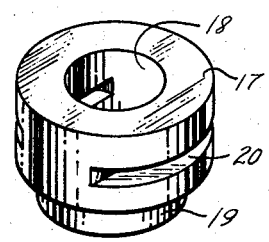
Fig. 2 is a perspective view of the retaining device housing shown in Fig. 1.
Figure 3:
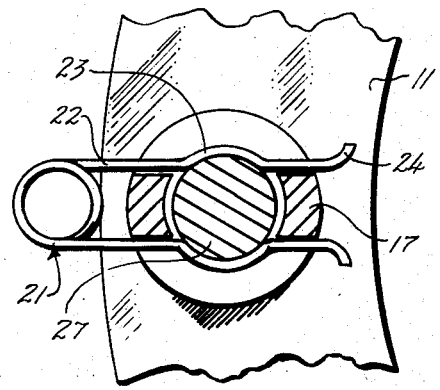
Fig. 3 is a view on line 3—3 of Fig. 1.

As is best shown in Figs. 2 and 3, upper portion of housing 17 is provided with a pair of slots 20 which are disposed on opposite sides thereof and communicate with aperture 18. A flexible retaining member 21, which is shown in the form of a high temperature resistant hairpin spring, is located in slots 20. Member 21 includes pin portions 22 which are curved outwardly adjacent aperture 18 as at 23 and flared at their ends 24 to permit insertion of the member. If it is desired, other forms of flexible members, such as a ring, can be employed.

A headed fastener 25, which is positioned in bore 18 of housing 17 and in aperture 13 of flange 11 includes a shank with a threaded portion 26, at its free end, a reduced shank portion 27, and threads 28. Shank portion 27 spaces threaded portion 28 from threaded end portion 26. While it is preferred that portion 28 have a greater pitch than portion 26 and have rounded crests and roots, both threaded portions can employ identical threads. Flexible retaining member 21 engages threads 28 of fastener 25 to retain securely threaded end portion 26 within housing 17 or within flange 11 and housing 17 during disengagement of threaded fastener retaining device identified generally at 29 to protect portion 26 against damage.

Device 29, comprises housing 17 with slots 20, flexible member 21 and headed fastener 25. Other positioning elements, such as welds, brackets or screws, can be used to provide proper engagement for member 21. However, member 21 positioned in slots 20 is preferred for simplicity and ease of replacement.

Figure 4:
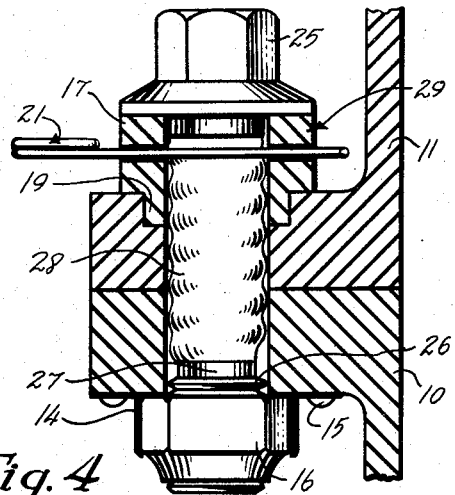
Fig. 4 is a sectional view similar to Fig. 1 in which the upper flange with threaded fastener retaining device is engaged with the lower flange.

In Fig. 4, upper flange 11 is shown affixed to lower flange 10 by means of fastener 25. Threaded end portion 26 of fastener 25 engages the threads of nut 16 within basket 14 attached to flange 10 to provide a tight joint between flanges 10 and 11. Since nut 16 is held securely against the lower outer surface of lower flange 10, portion 26 threads easily therein.

In the operation of fastener retaining device 29, housing 17 is positioned in upper end of aperture 13 of flange 10 by press fitting, welding, threading, keying or staking. Headed fastener 25 is located in aperture 18 of housing 17 and member 21 is inserted in slots 20 to engage threaded portion 28. The leading helix of threaded end portion 26 is held within housing 17 or within flange 11 above the lower opening of aperture 13 to restrain portion 26 from exposure outside flange 11. Upper flange 11 is positioned on lower flange 10 with the axes of apertures 12 and 13 in axial alignment. Sufficient pressure is applied to headed fastener 25 causing member 21 to separate and to allow fastener to slide into contact with nut 16. Threaded end portion 26 is then threaded in nut 16 to join flanges 10 and 11 tightly together. If it is desired, threads 28 can be threaded through member 21 to engage threaded end portion 26 in nut 16. Such threading forces member 21 to separate which allows threads 28 to jump portions 23 of member 21.

When it is desired to remove flange 11 from flange 10, headed fastener 25 is turned in reverse direction to unthread threaded end portion 26 from mating threads in nut 16. Threads 28 thread through member 21 by forcing the member to separate at 23. Fastener 25 is unthreaded until the lower end of threaded end portion 26 is within aperture 13 of flange 11 or within bore 18 of housing 17. When member 21 reaches shank portion 27 of headed fastener 25, the unthreading or lifting ceases and fastener 25 merely rotates. Shank portion 27 prevents threaded end portion 26 from engaging member 21 and unthreading completely fastener 25. In its disengaged condition, fastener 25 is retained by member 21 within housing 17 or within flange 11 and housing 17. Fastener 25 does not fall free from either end of retaining device 29.

While other modifications of this invention and variations of apparatus which may be employed within the scope of the invention have not been described, the invention is intended to include all such as may be embraced within the following claims.

What I claim as new and desire to secure by Letters Patent of the United States is:

1. A threaded fastener retaining device comprising a housing, a headed fastener including a head and a shank, said housing having an axial bore therethrough to slidably receive said shank, a threaded portion at the free end of said shank adapted to extend through said housing and to engage threads on a member to be secured on said housing, threads of greater pitch than the threads of said first threaded portion on the shank between the head and the first threaded portion of said headed fastener, a flexible member located on said housing to engage said shank to hold the first threaded portion of said headed fastener within said housing bore, and said flexible member adapted to resiliently engage said second threads and to feed said shank through the bore to engage the first threaded portion with threads on the member to be secured to said housing.

2. A threaded fastener retaining device comprising a housing, a headed fastener including a head and a shank, said housing having an axial bore therethrough to slidably receive said shank, a threaded portion at the free end of said shank adapted to extend through said housing and to engage threads on a member to be secured on said housing, threads of greater pitch than the threads of said first threaded portion on the shank between the head and the first threaded portion of said headed fastener, a reduced shank portion between said threaded portion and said second threads, a flexible member located on said housing to engage said shank to hold the first threaded portion of said headed fastener within said housing bore, and said flexible member adapted to resiliently engage said second threads and to feed said shank through the bore to engage the first threaded portion with threads on the member to be secured to said housing.

References Cited in the file of this patent

UNITED STATES PATENTS

| 575,751 | Zeilstra | Jan. 26, 1897 |
| 780,951 | Kulhanek | Jan. 24, 1905 |
| 1,644,298 | Ledbetter | Oct. 4, 1927 |
| 1,949,027 | Pancoe | Feb. 27, 1934 |
| 2,285,273 | Hall et al. | June 2, 1942 |
| 2,877,681 | Brown | Mar. 17, 1959 |

FOREIGN PATENTS

| 225,414 | Switzerland | May 9, 1943 |
| 976,239 | France | Oct. 25, 1950 |
| 279,221 | Switzerland | Mar. 1, 1952 |